INVENTORS.
James Perrin Coley, Basil Hubert Grose,
Stanley Leonard Hurst and Edgar Ian White

BY

THEIR ATTORNEY

INVENTORS.
James Perrin Coley, Basil Hubert Grose,
Stanley Leonard Hurst and Edgar Ian White

THEIR ATTORNEY

Feb. 25, 1964   J. P. COLEY ETAL   3,122,723
REMOTE CONTROL SYSTEMS
Filed May 25, 1959   9 Sheets-Sheet 9

INVENTORS
James Perrin Coley, Basil Hubert Grose,
Stanley Leonard Hurst and Edgar Ian White.
BY
W. L. Stout
THEIR   ATTORNEY

United States Patent Office 3,122,723
Patented Feb. 25, 1964

3,122,723
REMOTE CONTROL SYSTEMS
James Perrin Coley, Basil Hubert Grose, Stanley Leonard Hurst, and Edgar Ian White, all of King's Cross, London, England, assignors to Westinghouse Brake and Signal Company, Limited, London, England
Filed May 25, 1959, Ser. No. 815,647
12 Claims. (Cl. 340—163)

The present invention relates to remote control systems for controlling from, and indicating at, a control office the positions or states of apparatus at remote station locations. More particularly, our invention is concerned with such systems of the kind known as continuously scanning, wherein the positions of control devices at the control office and the positions or states of the items of apparatus at the remote locations are scanned in a continuously repeated sequence or scanning cycle.

This application is a continuation-in-part of our copending application for Letters Patent of the United States, Serial No. 737,062, filed May 22, 1958, for Remote Control Systems, now abandoned.

In the copending application for Letters Patent of the United States, Serial No. 710,718, filed January 23, 1958, by B. H. Grose and S. L. Hurst, for Remote Control Systems, now Patent No. 3,035,248, issued May 15, 1962, there is described a continuously scanning remote control system in which the scanning is performed by counting chains situated respectively at the control office and the remote location. These chains are each composed of a plurality of stages which, under the control of applied stepping pulses derived from a single pulse source, are adapted to cause successive code transmissions which characterize the positions or states of the control devices or the items of apparatus, and which are made in the one direction or the other, as the case may be, over a communication channel extending between the control office and the remote field location. Disconformity of the character of the code transmission made from the control office with the prevailing position of the item of apparatus affected by that transmission causes the position thereof to be changed automatically so as to conform to the new position of the corresponding control device. Similarly, disconformity of the character of the code transmission made from the remote station with the prevailing position or state of the relevant one of a plurality of indication devices at the control office causes a change to be effected automatically by that device so that the indication conforms to the new position of the apparatus. So long as conformity pertains, the code transmissions in either direction are ineffective to bring about a change.

Where apparatus distributed in groups at a plurality of separate remote locations widely spaced apart on a geographical basis is to be controlled and indicated, the remote control system described in Patent 3,035,248 may be duplicated between each of the remote stations and a common control office so that such separate systems scan simultaneously. However, this method of control operation is wasteful of control equipment and cannot be justified where the changes in controls and indications occurring at each remote location within short intervals of time are not sufficient in number to require continuous scanning to maintain efficient operation of the controlled system. Nevertheless, the total number of such changes occurring at all stations within the time interval may justify the continuous and sequential scanning of the items of apparatus at all stations. Thus a remote control system of this type in which a plurality of remote locations are controlled by a single office location economically provides a great advantage in the operation of such installations.

Accordingly, it is an object of our invention to provide a continuously scanning remote control system which controls a plurality of remote station locations from a single control office.

Another object of our invention is a remote control system in which items of apparatus located at a plurality of remote locations are controlled from, and their existing positions are indicated at, a single control location during a continuous scanning cycle which scans each item in turn regardless of location.

A further object of our invention is a multi-station, continuously scanning remote control system in which the transistion of scanning between stations occurs without loss of a stepping period.

Still another object of our invention is a remote control system in which the continuous scanning of the apparatus at a plurality of remote stations is accomplished without requiring the periodic transmission of distinct station selection steps at predetermined intervals throughout the stepping cycle.

It is also an object of our invention to provide a continuously scanning remote control system in which the scanning of similar stages of the control office counting chain and the field counting chain occurs simultaneously even though the total field stages are divided in a preselected pattern among a plurality of remote locations.

An additional object of our invention is a means to permit the sequential scanning of groups of counting stages located at a series of locations by a single stepping control chain located remote from all counting stage groups.

Other objects, features, and advantages of our invention will become apparent as the specification progresses when taken in connection with the accompanying drawings.

In practicing our invention in its various forms, we provide a remote control system, similar to the continuously scanning type disclosed in prior Patent 3,035,248, and which during a period of operation, scans all the functions at the field stations at least once in consecutive order without halting. The positions of control devices at the control office, and likewise the positions or conditions of items of apparatus at a plurality of remote stations, are characterized in sequence by code transmissions each made for the duration of a step period. These step periods are defined to follow directly one after the other at the control office and each of the stations under the control of a supply of stepping pulses derived from a single pulse source, preferably located at the office. The stations are arranged to become operative to receive and transmit the characterizing transmissions one after the other in the same predetermined order in each scanning cycle, the transition from one station to the next in the order being made between consecutive step periods. The whole of the cycle is therefore available for the transmission of information between the control office and the remote stations. That is, there are no step periods allotted to noninformative transmissions as is necessary where the transition between one remote station and the next is controlled by the counting at each station of distinctive transmissions made periodically to characterize in turn the completion of scanning at the corresponding stations. Disregarding any step periods during which no control code transmission is made, as for example, those assigned to indication functions for which there is no corresponding control function so that code transmissions are made only in the direction from the stations to the control office, the stream of information is uninterrupted during each scanning cycle except insofar as differences of transmission delay introduce breaks between the blocks of information being returned from the remote locations.

With a counting chain provided in the system as the means to carry out scanning at the stations, the stages of the chain are distributed, in accordance with the distribution of the apparatus, in groups of consecutively acting stages. Further means are provided to prevent the action of the stages in any one of the groups from being initiated until all the stages have acted in the preceding group or groups in the predetermined order. More particularly, according to the present invention, the continuously scanning remote control system requires for the execution of each scanning cycle a definite number of stepping pulses constituting a single series. There is provided means which is effective to condition the respective groups of counting stages at the stations for response only to different groups of consecutive pulses in said series of pulses, whereby, in any one scanning cycle, scanning proceeds from one group to another in a predetermined order.

The action of the counting chain stages themselves may be utilized to condition the stages of a subsequent group in this way. Thus, the last stage of any one group, with the exception of the last group in the predetermined order, may be adapted to render the stages of the next following group in the order ready to act as a result of that last stage acting. Alternatively, such last stages may be adapted to complete, as a result of their acting, an electrical connection capable of conducting the supply of stepping pulses to the stages of the next following group in the order. It will be appreciated that in the latter of these two cases, if the pulse source is common to all the separate groups of stages, the electrical connections between the groups are discontinuous to the supply of stepping pulses at the beginning of each scanning cycle but, as scanning proceeds, continuity of connection is advanced intermittently through the order of groups.

A further way in which the invention may be put into effect, when a single pulse source is common to all the groups, is for the groups of consecutive pulses to be made of differing frequencies. Filter means are then provided for each group of stages to render the stages thereof responsive only to the group of pulses of the assigned frequency. In this case, the order in which the scanning proceeds from one group to another may be predetermined without regard to the order in which the groups of stages are linked by the electrical connections extending between them and hence without regard to the geographical distribution of these groups.

As a still further way of putting the invention into effect, the means by which groups of stages subsequent to the first are conditioned for response may be actuated in dependence upon the action of at least those stages which precede those of the group at which the means is provided. Thus there may be provided at each of the field stations, with the exception of the first in the predetermined order, means which is effective in the course of each scanning cycle to register the stepping pulses. When the number of pulses registered by this means during a scanning cycle is equivalent to the number of counting chain stages at the preceding stations, a signal is emitted which is effective to initiate the action of the stages at the station at which the means is located.

Several particular embodiments of the invention will now be described in greater detail by way of example with reference to the accompanying drawings, and the novel features thereof defined in the appended claims.

Referring now to the drawings,

FIGS. 1A, 1B, and 1C, when taken together, show schematically an arrangement of apparatus, in block diagram form, to provide a continuously scanning remote control system of our invention for a two-station installation.

Figure 9:
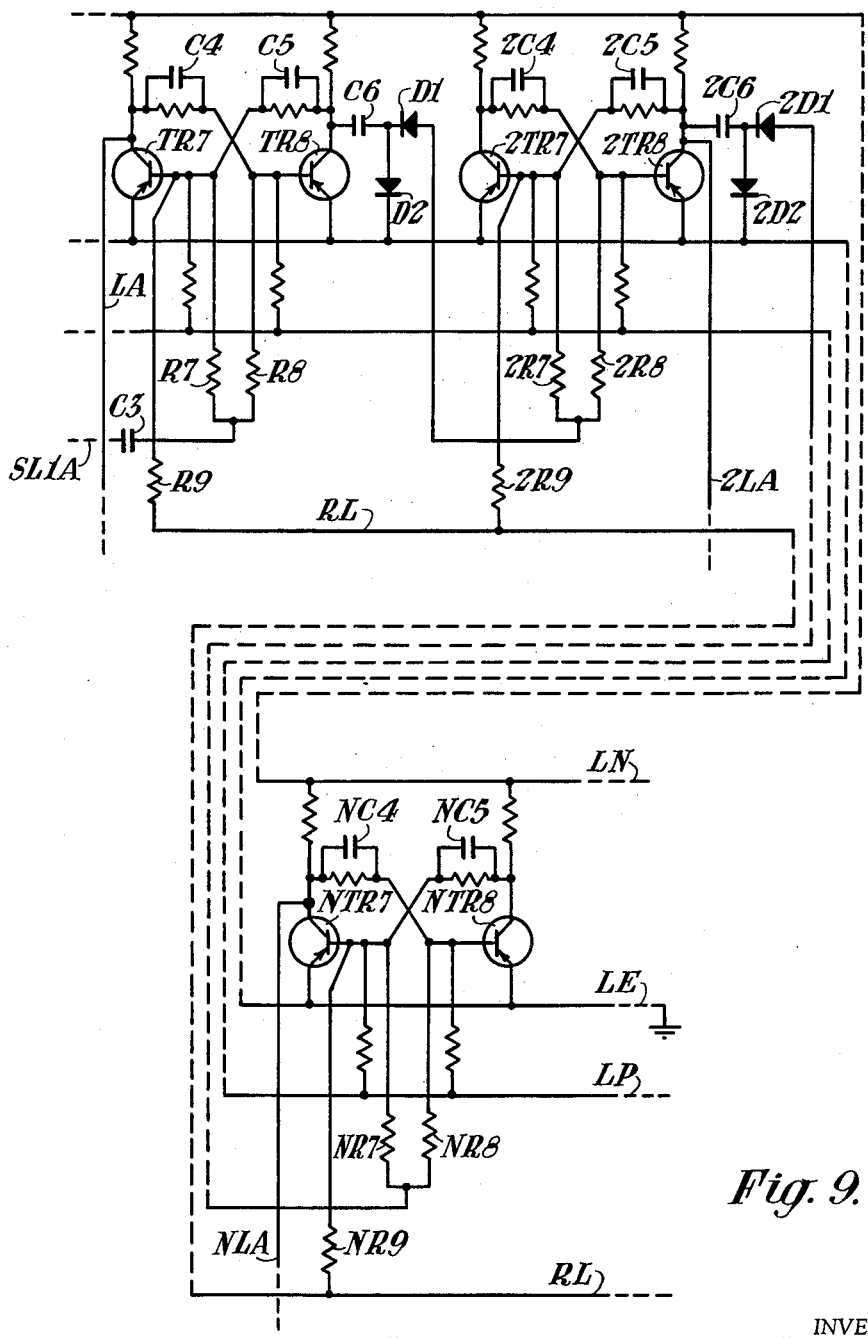

FIG. 9 of the drawings is a diagrammatic showing of a circuit arrangement at a field station for registering the number of stepping pulses during the course of each scanning cycle.

Figure 10:
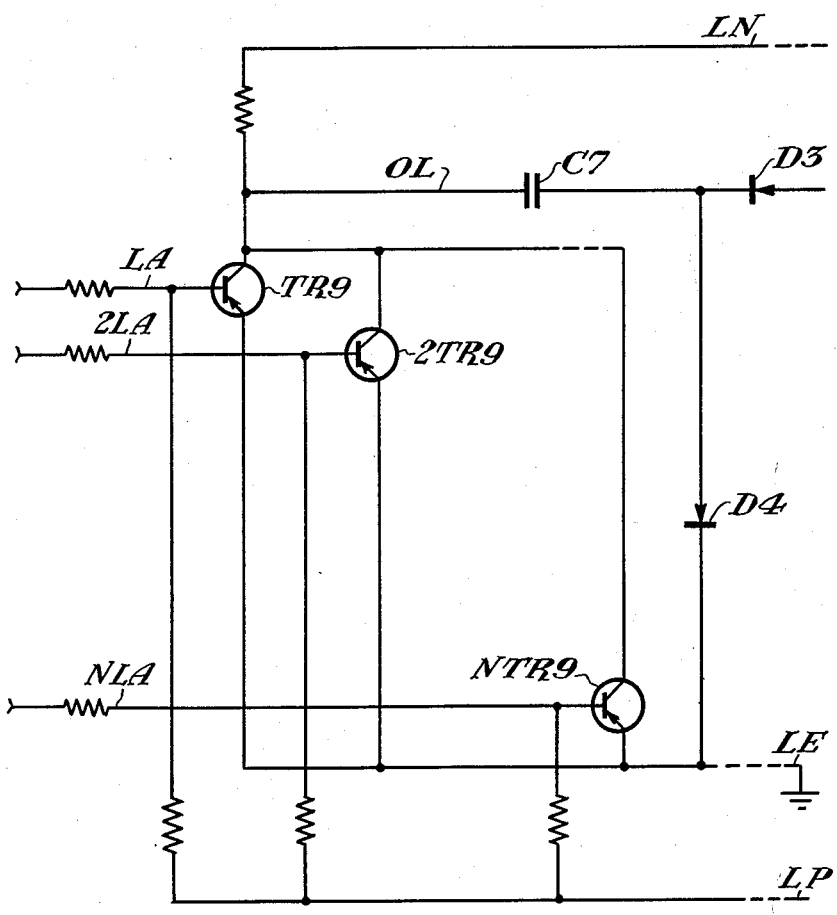

FIG. 10 is a diagrammatic showing of the detection circuit arrangement at any station which cooperates with the circuit arrangement of FIG. 9 to condition the station for operation in accordance with the stepping pulses when the number of pulses registered by the arrangement of FIG. 9 is that assigned to the corresponding station.

In each of the figures of the drawings, corresponding parts of the apparatus are designated by similar reference characters.

In each of the circuit diagrams shown in the drawings, it is assumed for purposes of a specific description herein that each transistor is of the p-n-p junction type. Thus, to the extent that references are made hereinafter to the polarities of the potentials applied to the circuit arrangements, these polarities will be those appropriate for transistors of this type. Opposite polarities would be necessary, as is obvious, if transistors of the n-p-n type were used. Such modification is intended to be included in the scope of our invention. Further in the drawings, it is assumed that each location is supplied with a source of direct current energy. This source may be a battery of proper capacity and potentials or may be any well-known power supply arrangement including a rectifier means. However, since such power sources are well known in the art, the actual details are not herein shown. For purposes of reference, this power source is indicated by bus wire connections, the positive potential bus being designated by the reference character LP and the negative potential bus by the reference character LN. A ground potential bus wire, which is connected at some selected intermediate point between the potentials represented by wires LP and LN, is designated by the reference character LE. The actual potentials of these various bus wire connections will be in accordance with the design of each system and the actual transistors and other circuit parameters chosen.

The remote control system under consideration comprises basically a counting chain situated at the control office which is composed of the number of stages necessary for the number of functions to be controlled in the field stations or for the number of indications informative of the states of the apparatus in those stations, which ever number is the greater. Located at all the field stations is a single complementary counting chain composed of an equal number of stages which are grouped at the field locations in accordance with the grouping of the remotely controlled apparatus. Thus, for each stage in the counting chain at the control office there is a corresponding stage at one of the field locations, the groups of stages at these locations each corresponding to a series of stages in the control office which are consecutive in the order of counting.

Figure 1A:
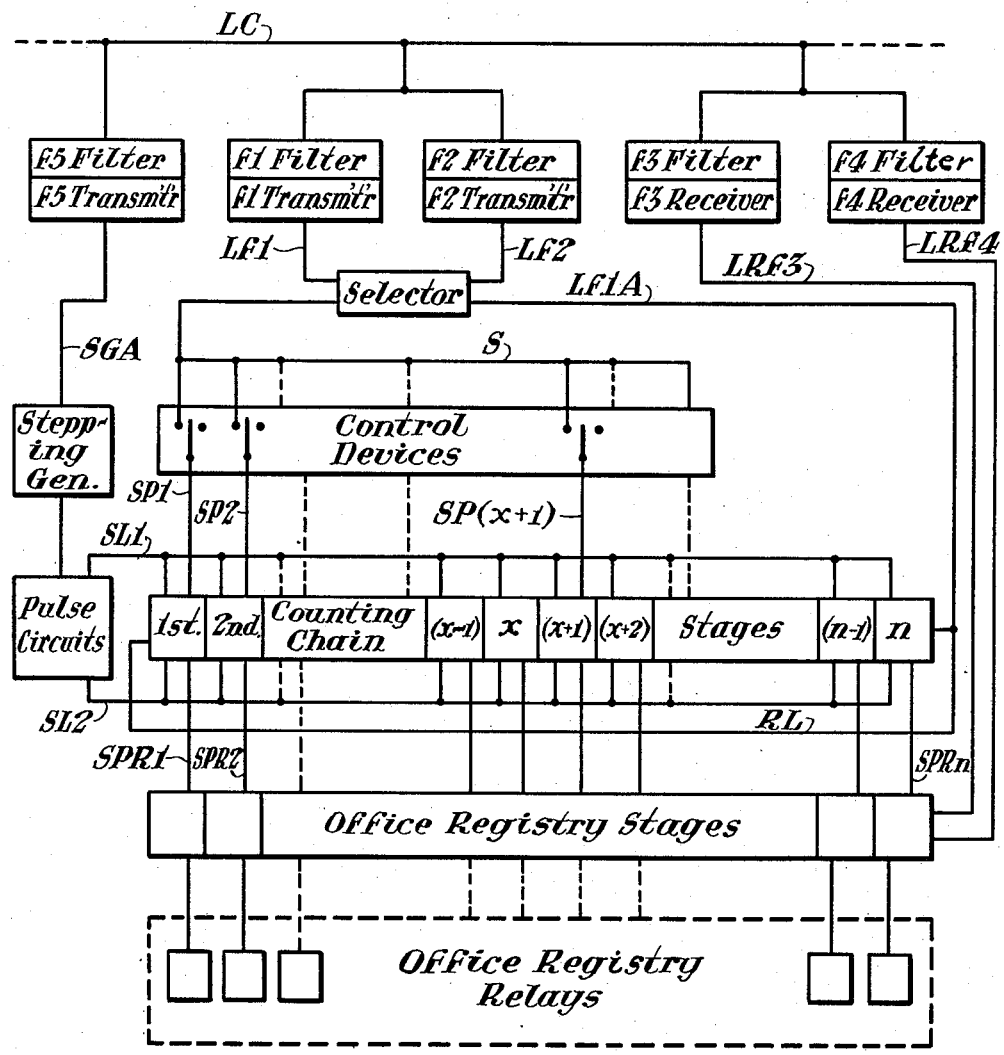
Figure 1B:
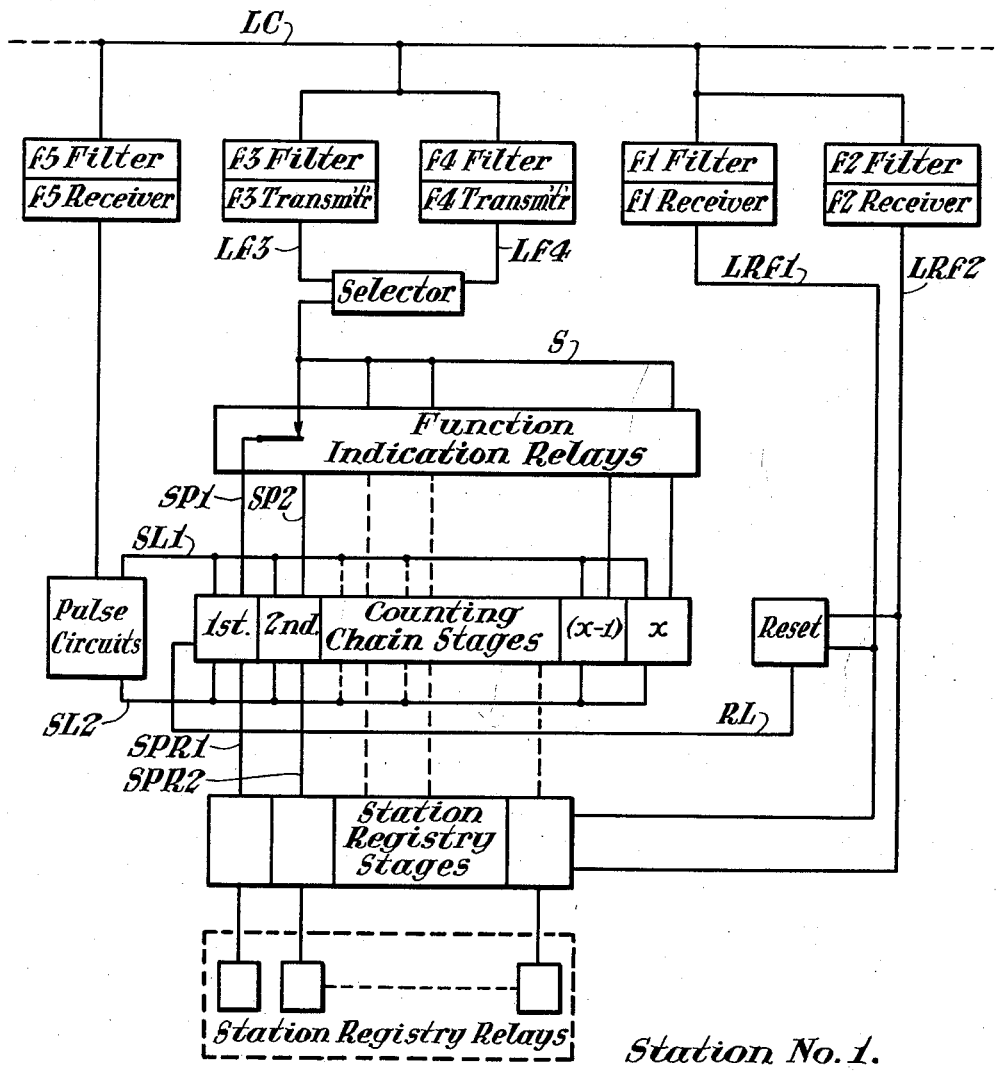
Figure 1C:
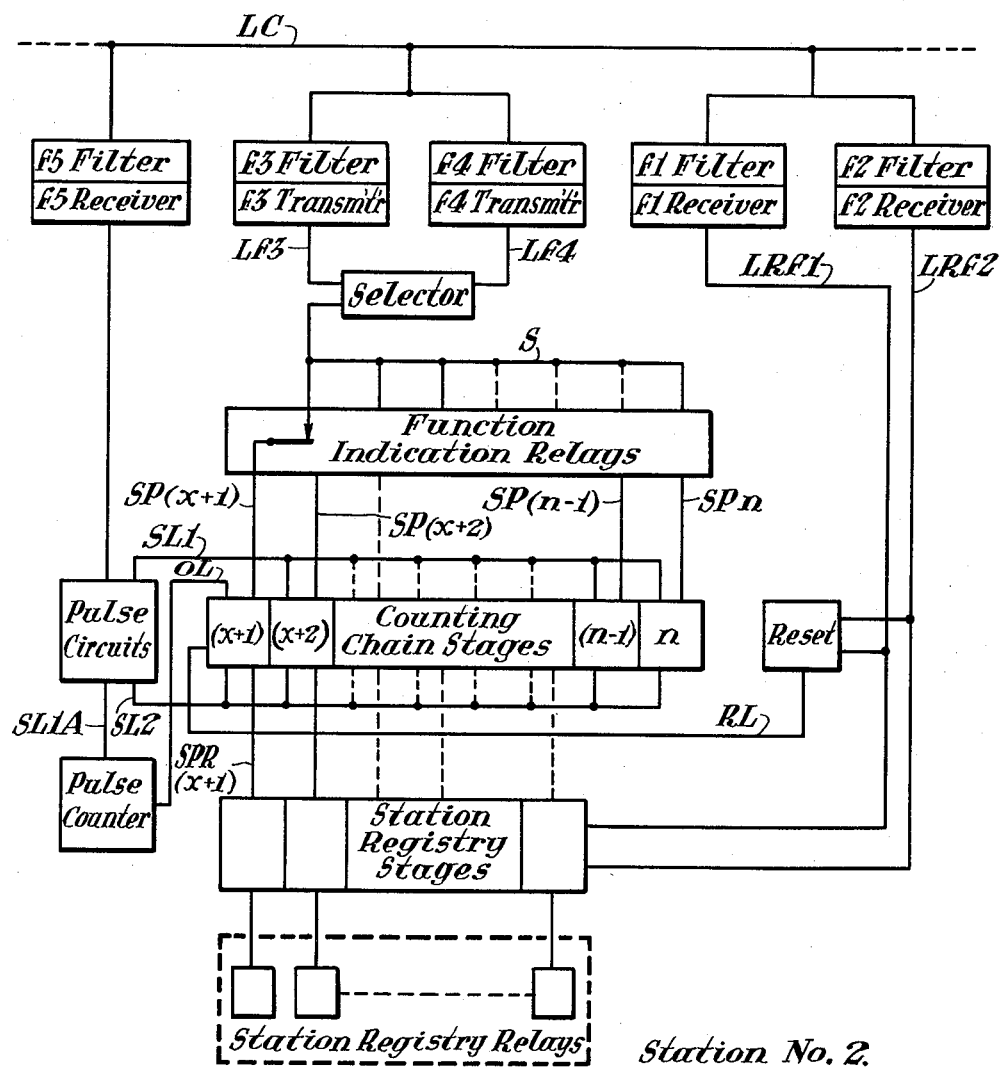

Referring now to FIGS. 1A, 1B, and 1C, these counting chains at the office and field locations are shown in block diagram form. These three figures of the drawings, when taken together, preferably with FIG. 1A to the left of FIG. 1B and FIG. 1C to the right thereof, illustrate in block diagram form a two-station, continuously scanning remote control system which embodies our invention. The office counting chain is shown in the center of FIG. 1A, which illustrates the office equipment generally. This counting chain is assumed to include $n$ number of counting stages, of which the first two, the last two, and four stages within the chain, but separated from the first and last pairs, are shown by specific blocks. It is further assumed that the counting stages from the first stage to stage $x$ deal with station No. 1 shown in FIG. 1B, while the remaining counting stages from $(x+1)$ to final stage $n$ deal with station No. 2 shown in FIG. 1C. The portion of the field counting chain assigned to station No. 1 is shown in FIG. 1B in the center of illustration, again by conventional block diagram, with the first two and the last two stages of this group specifically shown by individual blocks. Likewise, in FIG. 1C, the group of counting chain stages assigned to station No. 2 are shown by a conventional rectangle with again the first two of the group and the last two, which also are the last two of the entire chain, shown by individual blocks. The numbering of the counting chain stages shown specifically at each of the stations corresponds with the numbering or references used in the total office counting chain shown in FIG. 1A for proper correlation in the description.

Figure 2:
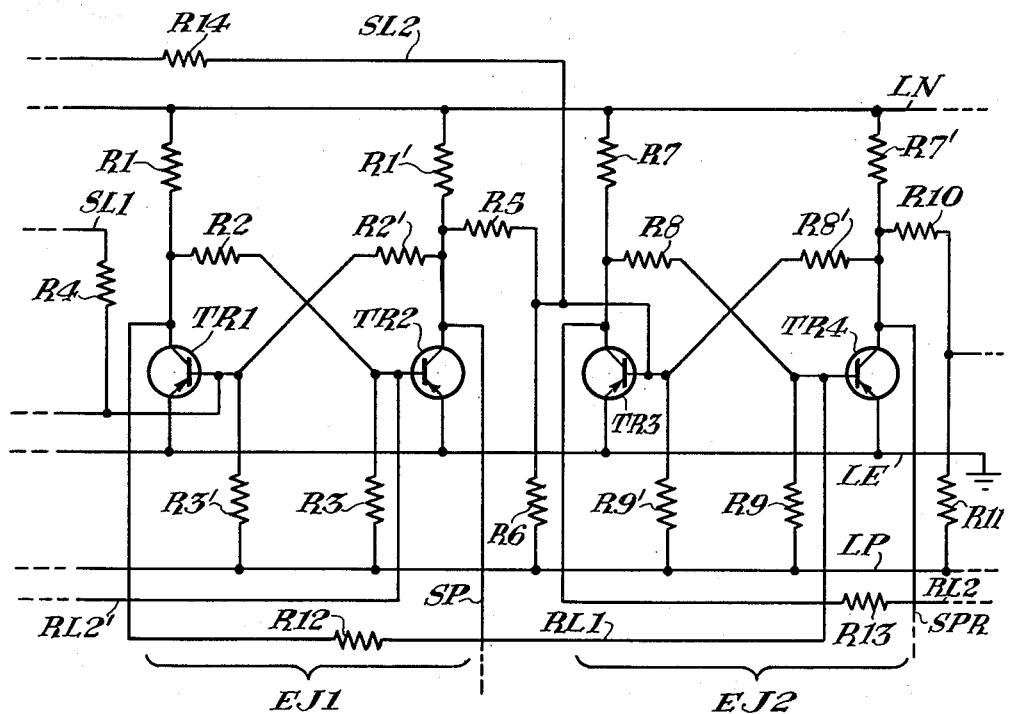
FIG. 2 shows in diagrammatic form the circuit arrangement for a single stage of the counting chain for either the office or a field station location.

Each stage of the counting chain, whether at the control office or a field station, is composed of a pair of bistable circuit arrangements, for example, of the type known generally as an Eccles-Jordan circuit, preferably employing junction type transistors as shown in FIG. 2. It is characteristic of an Eccles-Jordan circuit arrangement that its prevailing condition of conducting current is reversible by application of a stepping pulse thereto. The circuit is also stable in the reverse condition despite the continued application of otherwise operative stepping pulses until reset once more to its original condition. In the single counting chain stage shown in FIG. 2, the two Eccles-Jordan circuits constituting this stage are designated by the reference characters EJ1 and EJ2. Each of these two circuits includes two transistors, the pairs TR1, TR2 and TR3, TR4 respectively. As previously mentioned, these transistors are assumed to be of the p-n-p junction type and thus become conducting when the potential at the base of the transistor is more negative than the potential at the emitter. Each of these transistors, as are other transistors in other figures of the drawings, is shown by a conventional symbol.

The four transistors of the illustrated stage in FIG. 2 have their collectors connected to negative potential line LN through resistors R1, R1', R7, and R7', respectively, while their emitters are directly connected to line LE, which is at ground potential as indicated by the conventional symbol connected thereto. The bases of these transistors are connected to positive potential line LP through resistors R3', R3, R9', and R9, respectively. It is here noted that the illustrated counting stage is similar to that shown in FIG. 2 of the previously mentioned Patent 3,035,248 to which reference is made for a complete and full description of the operation of the counting chain stages in connection with the remaining elements of the basic system. It is believed necessary to herein include only a relatively brief description of the operation in order to provide a complete understanding of the present system.

The crossover connections characteristic of the Eccles-Jordan arrangement between the collector of one transistor of each pair and base of the associated transistor include resistors R2 and R2' for circuit EJ1 and resistors R8 and R8' in the case of circuit EJ2. The intermediate coupling between circuits EJ1 and EJ2 and the interstage couplings between circuit EJ2 and the circuit of the next stage corresponding to circuit EJ1, are shown to be both the same. That is, the collectors of transistors TR2 and TR4 are connected to line LP through resistors R5, R6 and R10, R11, respectively, and a connection is made from the bases of transistor TR3 and transistor TR1 of the next stage to a point between these respective pairs of associated resistors. Also connected with this point is a stepping pulse supply line, SL1 in the case of the interstage couplings and SL2 in the case of the intermediate coupling between circuits, these stepping pulse lines including resistors R4 and R14, respectively.

By means of the coupling circuits, the response of the Eccles-Jordan circuits to operative stepping pulses is made conditional upon the prior reversal of the immediately preceding circuit so that successively applied pulses advance the reverse condition in order down the chain from one stage to the next. The advance between stages is dependent upon the reversal of the condition of the intermediate Eccles-Jordan circuit EJ2 which in turn is dependent upon the supply of stepping pulses over the separate line SL2. Thus this supply of pulses affords an additional control on the advance of the reverse condition, which control is superimposed on that already afforded by pulses over the other stepping line SL1. This additional delay is utilized to insure a delay between the reversal of conditions of the main and intermediate circuits, and thereby to insure that the priming between one circuit and the next is not so fast as to render the next circuit responsive at a time when there is still prevailing a pulse which could reverse its condition but which is prior to the appropriate pulse. For this purpose, the operative pulses over line SL2 alternate with those over line SL1.

Describing in greater detail the action of the counting chain stages, the stepping pulses take the form of momentary interruptions of an otherwise steady positive potential. In the normal condition, transistors TR1 and TR3 are nonconducting and transistors TR2 and TR4 are of necessity conducting. The feedback over the crossover connections through resistors R2' and R8' is such that the potentials at the bases of transistors TR1 and TR3 are maintained positive even on the interruption of the positive potential of the corresponding stepping supply. Thus an additional negative potential is required at the bases of these transistors if their polarity is to be reversed from positive to negative. This further potential which serves for priming purposes is supplied to the base of transistor TR1 from the intermediate circuit EJ2 of the preceding stage. This priming potential is insufficient by itself to overcome the combination of the feedback and stepping supply potentials. Consequently, only when both the priming potential and an interruption representative of a stepping pulse in a stepping supply line are concurrent can the base of transistor TR1 become negative. Assuming its base to have become negative in this way, transistor TR1 becomes conducting. At this time, transistor TR2 becomes immediately nonconducting due to feedback through resistor R2 and its collector therefore approaches the full negative potential of negative line LN. As a result, the potential distribution in the resistance divider circuit composed of resistors R5 and R6 is shifted such that the connection of this divider circuit with the base of transistor TR3 becomes negative, thereby priming this latter transistor for response to the next stepping pulse over line SL2. When transistor TR3 becomes conducting, transistor TR4 of necessity becomes nonconducting and its collector approaches the full negative potential of line LN. The center or common connection of resistors R10 and R11 then assumes a negative potential, thereby providing a priming potential for transistor TR1 of the succeeding counting stage.

When transistor TR1 is conducting, its input impedance is very much lower than when it is nonconducting so that it cannot revert to its former condition when positive potential is restored to line SL1 after a stepping pulse. The main circuit EJ1 therefore remains in the reverse condition and the action of priming for response to the next stepping pulse is made between the one EJ circuit and the next to enable the advance of the reverse condition down the chain.

It has already been mentioned that, when circuit EJ1 reverses its condition and transistor TR2 becomes nonconducting, its collector approaches the full negative potential of line LN. This causes the potential of scanning pulse line SP connected to the collector of transistor TR2 to change from approximately the ground potential of line LE to nearly the full negative potential of line LN. This change in potential is used as a scanning pulse for transmission of the code pulse assigned to this counting stage, which action will be described in more detail shortly. A similar scanning pulse for receiving purposes is obtained by the corresponding potential change of line SPR, connected to the collector of transistor TR4, when this transistor changes from the conducting condition to its nonconducting condition.

The connection of the EJ circuits in cascade in each counting chain enables resetting of the circuits to cascade down the chain. Preferably, this resetting action is made more rapid by the provision of resetting lines RL1 and RL2 (RL2') including, respectively, resistors R12 and R13. These reset lines connect, respectively, the collector of transistor TR1 in the main EJ circuit with the base of transistor TR4 in the intermediate circuit, and the collector of transistor TR3 in the intermediate circuit with the base of transistor TR2 of the main circuit of the next stage. At the completion of a scanning cycle, during which all the stages have acted by reversal of the conditions of the EJ circuits, an appropriate pulse from an external circuit, to be described later, is applied to the base of transistor TR2 of the first stage to cause it to become conducting. Since, of necessity, transistor TR1 of this stage then becomes nonconducting, approximately full negative potential appears at its collector and is applied over line RL1 to the base of transistor TR4 of the first stage. This latter transistor therefore becomes conducting once again and transistor TR3 of necessity becomes nonconducting. With transistor TR3 nonconducting and its collector at nearly the full negative potential of line LN, a similar resetting action follows between circuit EJ2 of the one stage and circuit EJ1 of the next stage over line RL2. In this way, the action rapidly cascades down the chain until all the EJ circuits in the chain have been reset. At the stations, the reset pulse is applied to the first stage of the group of counting stages at that station and the resetting action cascades throughout the remainder of the group, each station initiating its reset action at approximately the same time.

Referring again to FIG. 1A, it should be noted that the scanning pulse line SP of each stage of the counting chain, in the schematic representation in this drawing, is connected to a two-position control device which in its one position passes the scanning pulse from a particular stage through selector line S to the selector unit. In its other position, the control device interrupts the circuit path and the scanning pulse is blocked from the selector unit. Depending upon whether or not the selector unit receives a scanning pulse during the period of time that a particular counting chain stage is active, the selector activates carrier transmitter f1 or f2, respectively, to transmit a code pulse of carrier current to the then active station. It is to be noted that the office and all of the stations are connected by a communication channel which may take the form, in the specific showing here, of a two-wire line circuit which is designated by the reference character LC, which appears in each of FIGS. 1A, 1B, and 1C. By this method, the scanning pulse made available by the reversal of the condition of circuit EJ1 of each counting stage is used through the selector unit to cause the transmission of code pulses of frequency f1 or f2. At the stations shown in FIGS. 1B and 1C similar action takes place with the two-position control devices of the office being replaced by contacts of the function indication relays. Depending upon whether or not the relay contact associated with a particular counting stage is closed, the scanning pulse is conducted to, or blocked from, the selector unit. This in turn causes the transmission of code pulses of frequencies f3 and f4 from the station to the office in order to carry the indication function associated with that particular counting stage.

The pulses of carrier current of the various frequencies are received through corresponding filter-receiver combinations at the stations and office. Associated with each counting chain stage, referring specifically to the office arrangement of FIG. 1A, is an office registry stage which, as fully explained in Patent 3,035,248, consists of a gating circuit and a two-stage circuit arrangement for the reception of the carrier code pulses from the station. The scanning pulse available when circuit EJ2 of each counting stage reverses its condition is conducted over the corresponding line SPR to the associated office registry stage. In accordance with the carrier receiver active at that time, the gating circuit passes the scanning pulse from the associated EJ2 circuit into the two-stage circuit arrangement in a manner to cause it to assume a corresponding condition to properly indicate the function received from the station. In a corresponding manner at each station, the active counting chain stage applies a scanning pulse to the associated field registry stage, which likewise includes a gating circuit and a two-state circuit arrangement. Thus, in accordance with whether carrier receiver f1 or f2 is active, the gating circuit in conjunction with the scanning pulse causes the two-state circuit arrangement to assume a corresponding condition to control the apparatus in accordance with the control code transmitted from the office. The actual controls at the field stations and the indications at the office are accomplished through the use of field registry relays and office registry relays, there being one such relay associated with each registry stage at the corresponding location.

Figure 8:
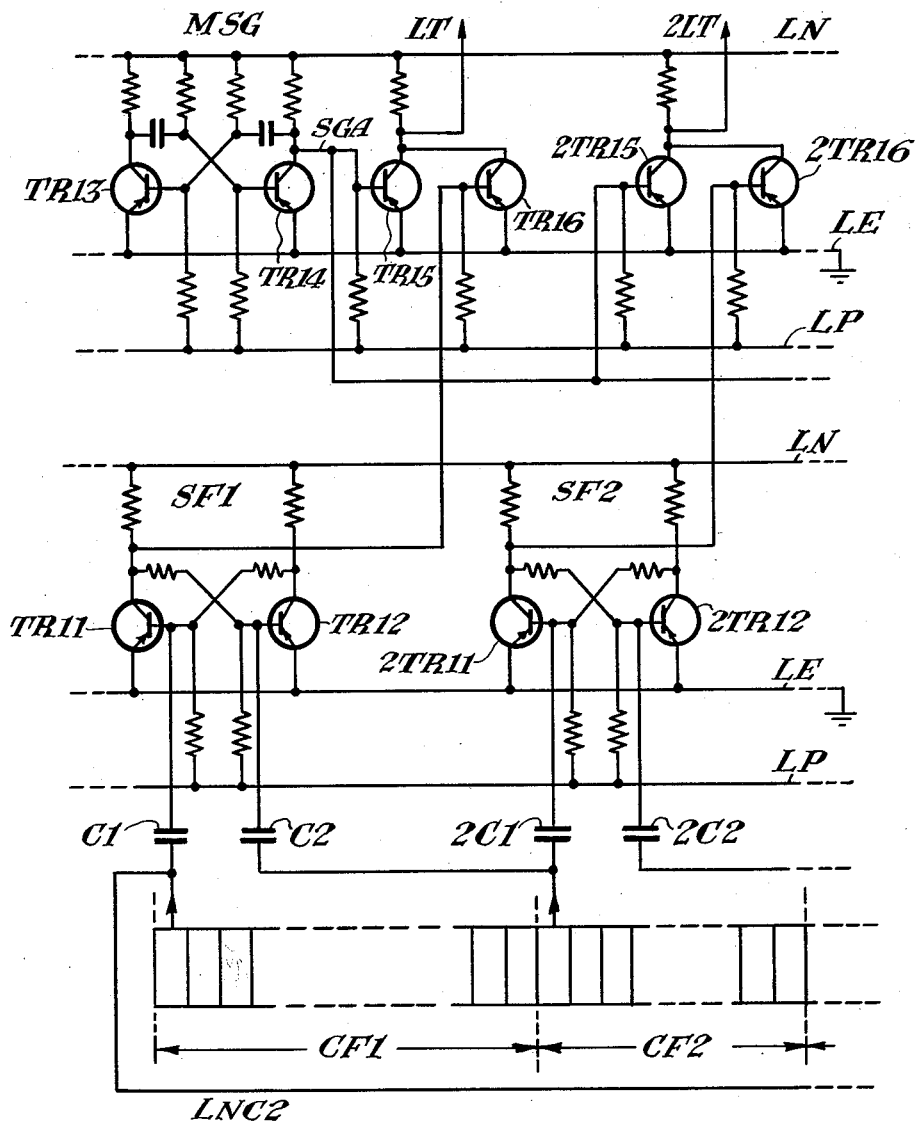
FIG. 8 shows a circuit diagram illustrating the form of the apparatus at the office to control the transmission of the stepping pulses from this location when different carrier frequencies are used, and is thus related to the station showing of FIG. 7.

The master supply for the stepping pulses which advance the action of the counting chain at the various locations is obtained from a master stepping generator, preferably located at the office location and indicated by the conventional block shown in FIG. 1A. This master stepping generator is preferably a conventional multivibrator, one form of which is shown in FIG. 8, but may also be a local source of alternating current of selected frequency. The pulses from the stepping generator are fed to a conventional pulse circuit element at the office, illustrated conventionally by a rectangle in FIG. 1A, which in turn provides alternate stepping pulses over lines SL1 and SL2, which were previously described in connection with the counting stage circuits. One specific arrangement for the pulse circuits is shown in Patent 3,035,248. In the general system shown in the three parts of FIG. 1, the pulse supply from the master stepping generator is transmitted over the communication channel by carrier current generated in transmitter f5, this current being of a frequency different from that used by any other carrier circuit provided in the system. At each station, a pulse circuit arrangement is fed, at the appropriate times and in various manners to be described hereinafter, by the master stepping pulses from the office. This pulse circuit arrangement in turn provides, during its active period, stepping pulses over the corresponding lines SL1 and SL2 at the field location. The details of the supply of these stepping pulses to the pulse circuits at the various stations and their control of the counting stage groups at that station will now be described in greater detail in order to explain fully the functioning of the arrangements provided by our invention. It is again noted that the complete description of the basic operation of the pulse circuits and their control of the counting chains is contained in the previously mentioned Patent 3,035,248.

As has been previously indicated, the stages in each of the two counting chains are caused to act consecutively and in synchronism with those in the other chain by a supply of stepping pulses derived from a common pulse source and applied to both chains. This source is conveniently situated at the control office and in the illustrated embodiments the stepping supply is applied to the field counting chain over the same communication channel as is used for the transmission of the aforementioned codes. Thus, there is shown in the drawings (FIGS. 3 to 10) only what is necessary for an understanding of how this stepping supply is arranged to cause the scanning to proceed from one field location to another in a predetermined order. In this respect, it is the transition between one location and the next which will be considered, it being assumed that once scanning has been initiated at a field location it proceeds step by step under the control of the stepping supply, as previously described, until completed at that location.

Referring now to the block diagrams of FIGS. 3 to 7, the first two field locations of a plurality of series-linked locations are shown in each of the figures and are designated respectively F1 and F2, it being understood that these locations are widely separated, as are also the further locations to which the communication channel extends. Furthermore, in each case, the group of counting chain stages provided at the particular field location, together with the associated circuit equipment, is represented by the conventional rectangle designated C1 or C2, as the case may be.

Figure 3:
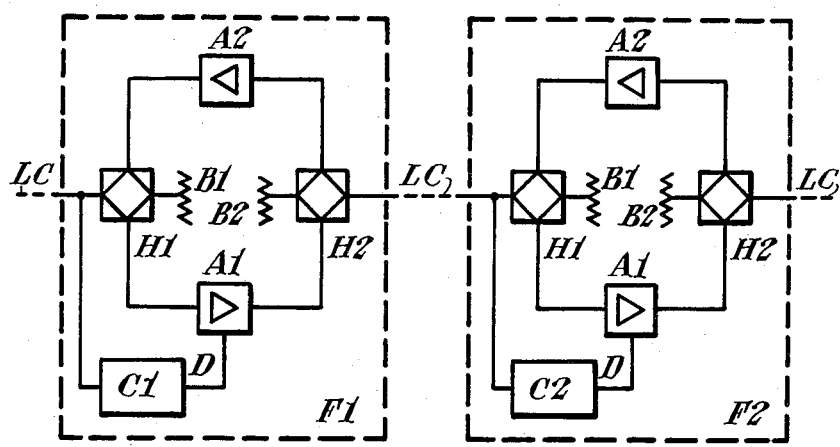
FIG. 3 shows in block diagram form one embodiment of the means at the field stations for controlling the sequential action of the station counting stage groups.

According to the embodiment of FIG. 3, the channel to the field locations is discontinuous to the stepping supply beyond station F1 at the beginning of each scanning operation. However, as a result of the action of the last counting chain stage of the group C1 at the first location F1, a switch means is closed to establish an electrical connection capable of conducting the stepping supply to the second location F2, such electrical connection being advanced in this way to the next group, as each last stage is caused to act, until the last location is reached. Although such switch means may be arranged in the manner of a simple switch adapted to make and break the channel at the appropriate point, in FIG. 3 it is seen to be incorporated in a repeater unit. This unit takes the form of a well-known circuit arrangement comprising amplifiers A1 and A2, one for each of the two directions of transmission over the channel, and matched hybrid transformers H1 and H2 which together with respective balancing networks B1 and B2 serve to isolate the input of either amplifier from the output of the other. Amplifier A2 is at all times active so as to allow transmission of the incoming indication codes $f3$ and $f4$ from more remote field locations in the direction towards the control office. Only the incoming indication codes are transmitted in this direction, but in the other direction, through amplifier A1, the transmission of the outgoing control codes $f1$ and $f2$ is accompanied by the stepping supply, i.e., pulses of frequency $f5$. Amplifier A1 therefore acts as the switch means in that it is normally inactive so as to block the further transmission of the master stepping pulses but is made active to allow the transmission of this supply to the next location by the reception over the line D of a pulse emitted by the last counting chain stage of the associated group (C1 or C2) as it is caused to act. That the outgoing control codes $f1$ and $f2$ are blocked in the same way as the stepping pulses $f5$ is unimportant since, as is also the case with the incoming indication codes, the codes being transmitted at any time are relevant only to the control device and apparatus being scanned at that time.

The line D is connected to the collector of a transistor of one of the Eccles-Jordan circuits included in the last counting chain stage and whose condition is reversed in the course of the step period defined by that last stage.

Transistor TR4 (FIG. 2) is preferably selected for such connection since it becomes nonconducting upon reversal of the state of Eccles-Jordan circuit EJ2 so that the reversal imposes a negative voltage signal on line D, which is connected to line SPR of FIG. 2. It is in response to this signal that amplifier A1 is made active and remains active so long as the signal persists. Only on resetting of the station counting chain, when all the stages are restored to their former conditions, is the signal removed. Consequently, once made active, amplifier A1 will remain active to pass the stepping supply to more remote field locations until the end of the scanning cycle.

Figure 4:
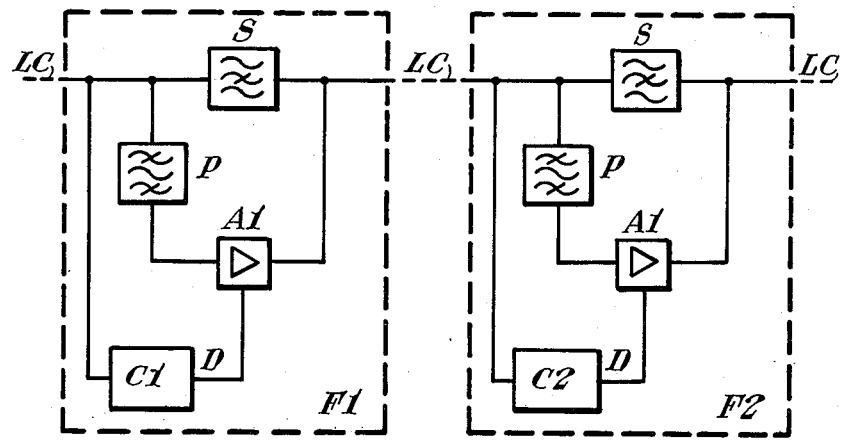
FIG. 4 is a diagrammatic showing of another form of the means at the stations for controlling the action of the counting stage groups.

The embodiment of FIG. 4 is a modification of that of FIG. 3, the amplifier A1 shown therein at each field location being controlled over line D from the associated last counting chain stage in exactly the same way as the corresponding amplifier in FIG. 3. However, in parallel in the communication channel with amplifier A1 is a band stop filter S tuned to reject the frequency of the stepping supply but to pass without undue attenuation the control and indication codes. In the parallel circuit including the amplifier is a band pass filter P tuned to pass the stepping supply frequency $f5$ but not the codes. Thus only the stepping supply pulses pass over the parallel line to the amplifier and consequently it is this supply alone which is subject to the control of the amplifier. The stepping supply is therefore withheld from location F2 until all the counting chain stages of location F1 have acted, in the same way as in FIG. 3. It will be evident that the filters P and S also serve to isolate the input and output of the amplifier.

Figure 5:
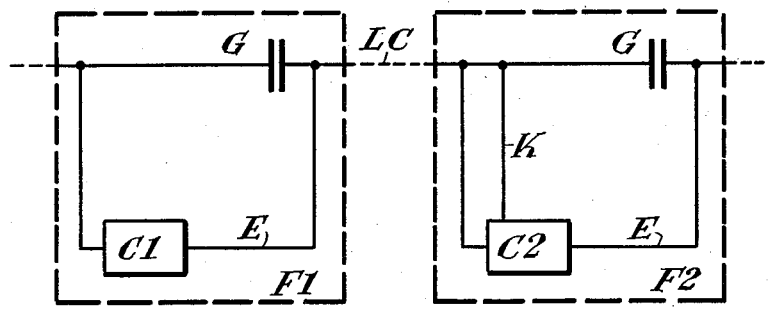
FIG. 5 shows, by block diagram, still another form of the transition means at the stations for controlling the sequential action of the station mounting groups.
Figure 6:
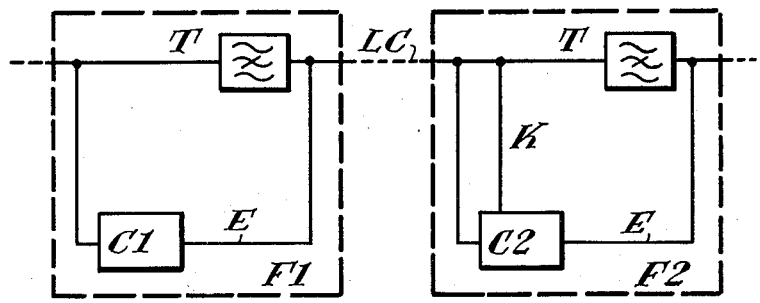
FIG. 6 represents, in diagrammatic form, a fourth embodiment of the control means at the station for sequentially conditioning the corresponding station counting stage groups for following the stepping pulses.

In the embodiments of FIGS. 5 and 6, the groups of counting chain stages at all the field locations, with the exception of the first, act in response to the stepping supply only when properly prepared by means of a priming condition. Once they are subjected to this priming condition, the stages in a group commence to act consecutively under the control of the stepping supply. The priming condition is generated as a result of the last counting chain stage in a group being caused to act, although it is not necessary that the last group should generate a condition of this sort.

According to FIG. 5, the priming condition takes the form of a pulse of steady direct current which is applied to the line circuit LC over a line E. In order that this priming pulse may not be transmitted further than the next location, and thereby to insure that it primes only the stages grouped at that location, the line wires are made discontinuous to direct current by the interposition of capacitors G at all the field locations, with the possible exception of the first. Line E is connected to the line wires on the remote side of the capacitor. A line K connected to the line wires between one capacitor and the next serves to apply the steady direct current energy to the first stage of the group which the pulse is to condition for acting.

According to FIG. 6, the priming condition takes the form of a distinctive carrier frequency for which provision is made at each of the field locations, with the exception of the last, in the form of an appropriate carrier transmitter which is assumed to be included as part of the circuit equipment associated with each group of counting chain stages C1, C2. In place of capacitors G of FIG. 5, use is made of band stop filters T which are tuned to reject the specific priming carrier frequency but to pass without undue attenuation the stepping supply and the indication and control codes. The transmitter for the specific priming carrier frequency becomes operative to transmit in response to a negative voltage signal which is obtained from the last counting chain stage at the particular field location in the manner previously described with reference to the embodiment of FIG. 3. Once the transmitter at a particular field location has been made operative, the line circuit transmits the priming carrier frequency over the section to filter T at the next location in order. Over line K preceding filter T, the priming carrier frequency is applied to a receiver (also assumed to be included as part of the circuit equipment associated with each counting stage group C1, C2) which is provided at each of the field locations with the exception of the first in the order and which is responsive to the applied priming carrier frequency to prime the first counting chain stage at this next location. As has been already described with reference to FIG. 3, resetting of the counting chains at the end of the scanning cycle removes the negative voltage signals which by that time will have been imposed on all the priming carrier frequency transmitters. These transmitters are thus made inoperative in preparation for the next scanning cycle.

Figure 7:
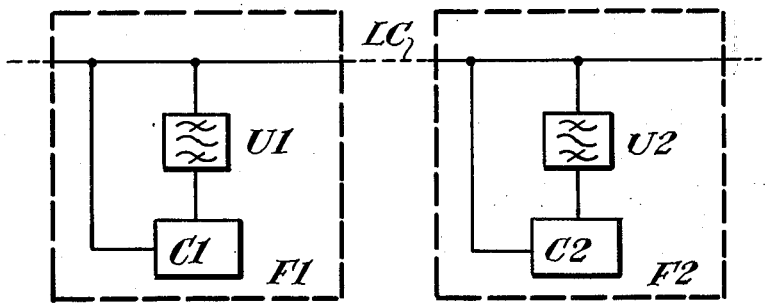
FIG. 7 represents another form of the control apparatus at the station for use when the group of stepping pulses for each station is transmitted on a different carrier frequency.

In the embodiment of FIG. 7, the stepping supply is transmitted over carrier circuits of various frequencies instead of a circuit of constant frequency as in the preceding embodiments. Each field location is assigned, for stepping purposes, a distinctive carrier frequency, for example, $f5$ in the case of location F1, $f6$ in the case of location F2, and so on for all the field locations. At each field location, a band pass filter, such as those designated U1, U2 at the illustrated locations, is provided in the connection by which the stepping supply is applied, through the proper receiver, to the counting stage group. Each such filter is tuned to pass only the stepping carrier frequency assigned to that particular location. The communication channel, over which the stepping frequencies are also transmitted, is therefore continuous to all frequencies through all the field locations.

Referring now to FIG. 8, shown therein are the office circuits for selecting and transmitting, at the proper time, the master stepping pulses for stations F1 and F2 of FIG. 7. At the bottom of FIG. 8, the groups of office counting chain stages corresponding to the first and second field locations are designated respectively CF1 and CF2. The transmitter selector circuits for the carrier transmitters (not shown) for the stepping carrier frequencies $f5$ and $f6$ for the first and second field locations are designated SF1 and SF2. These selector circuits are each composed of a bi-stable circuit in the form of an Eccles-Jordan circuit employing junction-type transistors, designated TR11 and TR12 in circuit SF1. The references for the transistors in circuit SF2, as well as the other counterparts in the circuits associated with the transmitter for station 2, are similar and are distinguished by the prefix 2. Associated with each selector circuit are capacitors C1 and C2 connected, on the one hand, respectively, to the bases of transistors TR11 and TR12 and, on the other hand, to the collector of a transistor of an Eccles-Jordan circuit, in the selected stages of the office counting chain, whose state is reversed at the commencement of the step period defined by the particular stage. Specifically, transistor TR2 (FIG. 2) is selected for such connection as being one which becomes nonconducting upon reversal of the state of the Eccles-Jordan circuit EJ1. The connection is made over line SP so that the reversal imposes a negative voltage signal on the capacitor concerned. The stage selected for connection to capacitor C1 is the first one of the station group with which that capacitor is associated while for connection to capacitor C2 the first stage of the next group is selected. Thus, it will be seen that capacitors C2 and 2C1 are connected in common to the first stage of group CF2. Similarly, by means of a line LNC2, a capacitor NC2 (not shown) associated with the last group in the order is connected to the first stage of group CF1 in common with capacitor C1 shown as associated with that group.

A master stepping signal generator circuit MSG appears at the top left of FIG. 8 and employs transistors TR13 and TR14 in a configuration similar to the well-known vacuum tube multivibrator. As the circuit MSG continuously reverses its conditions in the well-known manner, the collector of transistor TR14 has alternately a ground and a negative potential. Line SGA connected to this collector thus periodically carries a pulse of negative potential. Line SGA is the equivalent of line SGA connecting the stepping generator and transmitter $f5$ in FIG. 1A, which illustrates the use of a single frequency stepping supply. In the form shown in FIG. 8, however, line SGA is connected in multiple to the bases of a series of transistors TR15, there being one such transistor associated with each transmitter selector circuit SF, as indicated by the numerical prefix to the reference character TR15. Each transistor TR15 is paired with a similarly designated transistor TR16, the collectors of each such pair of transistors being connected through a common resistor to line LN and their emitters in multiple to line LE. From the base of each transistor TR16, a connection is made to the collector of transistor TR11 in the respective transmitter selector circuit SF. Through the lines LT, the collectors of transistors TR15 are connected to the respective stepping supply carrier transmitters.

An output from the stepping generator is also applied to the pulse circuits at the control office, as shown in FIG. 1A, which in turn supply pulses at the desired stepping rate to the office counting chain over lines SL1 and SL2. The complete showing and description, if desired, is available in the previously mentioned Patent 3,035,248. At the beginning of a scanning cycle, the first stage in group CF1 is reversed by the applied stepping pulses whereupon the negative voltage signal supplied to capacitor C1 is translated into a negative pulse which is applied to the base of transistor TR11 in selector circuit SF1. As a result, transistor TR11 becomes conducting and hence, of necessity, transistor TR12 becomes nonconducting, thereby reversing the previous state of circuit SF1 which is assumed, as will appear shortly, to have been the opposite. The negative bias at the base of transistor TR16 is therefore removed so that this transistor becomes nonconducting and is no longer able to shunt to ground any voltage tending to build up at the collector of transistor TR15. The negative-going, square waveform output of the stepping generator, which is continuously driving transistor TR15 conducting and nonconducting alternately, consequently produces in line LT a corresponding waveform which is reproduced at the first field location over the distinctive carrier circuit for that location. This master stepping supply is there translated by pulse circuits, in the same way as at the control office, into pulses at the desired stepping rate for application to the field counting chain stages grouped at that location.

When the scanning cycle has progressed to the point of completing the first group of office counting chain stages, the first stage of the next group CF2 is caused to act with the same effect on selector circuit SF2 as already described with reference to selector circuit SF1. Briefly, the negative potential on line SP($x$+1) produces a negative potential pulse through capacitor 2C1 which is applied to the base of transistor 2TR11, causing it to become conducting. When the potential at the collector of this transistor thus changes to the ground potential, transistor 2TR16 becomes nonconducting and can no longer hold the common collector connection with transistor 2TR15 at ground potential. The alternate operation of transistor 2TR15 between its conducting and nonconducting conditions, as controlled by the output of generator MSG over line SGA, now provides a corresponding pulse output over line 2LT to the stepping carrier transmitter for the second station. This results in the transmission of a master stepping supply which is received by the second station to drive the field counting chain stages at that location. The output from the first stage of group CF2 is, however, also effective on capacitor C2 as well as on capacitor 2C1. The negative pulse produced by capacitor C2 at the base of transistor TR12 brings about the reversal of selector circuit SF1 to its former or normal condition. During the time, therefore, that the second field location is operative to receive and transmit, the supply of master stepping pulses is transmitted with the distinctive carrier frequency *f6* to which only that location is responsive, the transmission with carrier frequency *f5* having been discontinued by the second reversal of selector circuit SF1. The cycle continues to completion with the frequency character of the stepping supply transmission being changed in this manner as the scanning of each field location is completed.

In the embodiment according to FIGS. 9 and 10, there is provided at each of the field locations, with the exception of the first in the order, a binary counter composed basically of a number of bi-stable circuit stages employing transistors. These stages are connected in cascade and adapted to register applied pulses in binary form from a single input to the first bi-stable circuit. The condition of the first bi-stable circuit stage is reversed by each of the applied pulses while succeeding stages in the counter reverse their conditions only once for every two reversals of the immediately preceding stage. The pulses which are applied to these counters over line SL1A are at the master stepping frequency, similar to those applied to the field counting chain stages grouped at the field location concerned over stepping line SL1 from the pulse circuits. The counters are effective to count these pulses and thus register the number of individual step periods which have occurred at any time in the scanning cycle.

The binary counter shown in FIG. 9 has an Eccles-Jordan bi-stable circuit employing two junction-type transistors in each stage. These transistors are designated TR7 and TR8 in the first circuit and similarly in the second and final or Nth stage, also shown, but with the appropriate prefix 2 or N, respectively. In the first stage, a pulse steering resistance arrangement comprising resistors R7 and R8 in parallel is connected, on the one hand, to the bases of these transistors and, on the other hand, to a capacitor C3 through which the pulse input is made. A similar steering resistance arrangement is connected to the bases of the transistors in each stage. The characteristic cross couplings between transistors include capacitors C4 and C5 to insure stability of operation. An interstage coupling extends between the collector of transistor TR8 of one circuit to the steering resistance arrangement of the next circuit. Each includes a capacitor C6, a diode D1 poled to oppose the application of positive pulses to the succeeding steering resistance arrangement, and a shunt path to ground in which is disposed a diode D2 poled to allow such positive pulses to be shunted away.

Initially, before counting commences, transistors TR7 of all the stages of the counter are conducting and transistors TR8 are therefore nonconducting. The application of a negative stepping pulse to capacitor C3 produces in the steering resistance arrangement R7, R8 a negative pulse which will have no effect on the base of transistor TR7, since this is already negatively biased, but will change the base of transistor TR8 to a negative bias so as to cause this latter transistor to become conducting. Over the cross-coupling a positive transfer potential is applied to the base of transistor TR7 to cause it to become nonconducting, the capacitors in the cross-coupling insuring that such positive transfer pulses are of greater duration than the negative pulse produced by capacitor C3. The positive transfer pulse will, however, have decayed before the next negative pulse is applied through capacitor C3, this next negative pulse causing the circuit to revert to its former conditions.

In response to the second negative pulse, and each alternate subsequent negative pulse, transistor TR8 becomes nonconducting. This produces, through capacitor C6, a negative pulse which is passed through diode D1 to the steering resistance arrangement of the second circuit to reverse the condition of that circuit, transistors 2TR8 and 2TR7 alternately becoming conducting. The second change of condition of the second stage and each succeeding alternate change thereafter effects a change of condition in the third circuit. As additional negative pulses are applied through capacitor C3, a similar ratio of operation extends throughout the binary counting stages to the Nth circuit. Said in another manner, each two condition reversals in any one EJ circuit stage of the counter produces a single condition reversal in the subsequent EJ circuit stage of the N stages provided. It is to be noted that, when transistor TR8 becomes conducting, the positive pulse produced in capacitor C6 is shunted to ground through diode D2 and therefore plays no useful part in the operation of the circuit.

The resetting of the circuits in the binary counter to the condition in which the transistors TR7 are conducting and the transistors TR8 nonconducting is accomplished at the end of the scanning cycle by means of the resetting pulse, assumed in this case to be a negative pulse, by which resetting of the counting chain stages is also accomplished at the field locations. As shown, this resetting pulse is applied over a reset line RL through respective resistors R9 to the bases of the transistors TR7 so that wherever one of these transistors is nonconducting at the end of the scanning cycle, the negative resetting pulse impressed on its base causes it to become conducting, and hence the associated transistor TR8 nonconducting.

Any number within the counting capacity of the binary counter may be expressed in terms of the transistors TR7 and TR8 which are conducting in the series of circuit stages of which the counter is composed. For example, the number 3 is represented in this way by the conducting condition of transistors TR8 in the first two stages of the series and transistors TR7 in the remainder. The collector of each transistor of the combination designating, in a similar manner, the number one greater than the number of step periods in the scanning cycle preceding the first step period of the group assigned to the location at which the binary counter is situated, is connected respectively by the lines LA to the bases of the corresponding designated transistors TR9 included in a multi-input AND circuit shown in FIG. 10. By way of specific example, these lines LA are connected in FIG. 9 to the collectors of transistors TR7, 2TR8, and NTR7 and are designated by corresponding prefixes. The collector to emitter circuits of the transistors TR9 are connected in parallel between negative line LN and ground line LE. Their bases are preferably biased positive, in the absence of negative output over lines LA from the counter circuits, by respective connections with positive line LP so that, when so biased, the transistors are held nonconducting. The collectors of the transistors TR9 are connected in common to an output line OL including a capacitor C7 and a diode D3 poled to pass negative pulses from the capacitor. Also provided is a shunt path to ground in which is disposed a diode D4 poled to permit positive pulses from the capacitor to be shunted away. Preferably, output line OL is so connected to the first stage of the group of counting chain stages at the field location where the counter is situated that the pulse for causing circuit EJ1 of the first stage to reverse condition is supplied over line OL instead of over stepping pulse line SL1 from the station pulse circuits. This avoids the possibility, due to the small inherent time delays involved in the operation of the counter and the AND circuit, that a mere priming of this EJ1 circuit by the pulse over output line OL may occur slightly too late for the usual stepping pulse over line SL1 to be properly effective.

So long as there is at least one of the transistors TR9 in the conducting state, the common collector potential in the AND circuit will be held at approximately zero (ground) potential. The connections of the lines LA must be chosen so that this condition prevails throughout the counting action and that an intermediate condition of the various counting stages does not incorrectly create the full count condition hereinafter described. To this end, it may at times be necessary to provide an additional counting stage in the counter which is not otherwise required to obtain the full desired count. This action is necessary, for example, when the desired count is equal to the maximum count obtainable with a particular number of stages. When the counter registers the selected count and all of the transistors TR7 and TR8 to which the lines LA are connected become conducting, all transistors TR9 become nonconducting so that the common collector potential swings negative. A negative pulse signal is then applied by capacitor C7 through diode D3 to the first stage of the local group of counting chain stages. When the common collector potential reverts to zero on further counting by the binary counter, the positive pulse produced by capacitor C7 is shunted to ground through diode D4.

It is not necessary that all the binary counters be capable of counting to the total number of step periods in the scanning cycle. In each case, the counter need be capable of counting only to the number, plus one, of step periods in the cycle preceding the group of steps assigned to the corresponding station. It is also immaterial that the counter causes its AND circuit to give, in the course of the scanning cycle, outputs subsequent to the one which renders the field location operative to receive and transmit, for once the counting chain stages have completed the scanning at that location and their conditions are consequently reversed, they remain unaffected by such subsequent outputs until they are reset. Thus, particularly at stations early in the order of scanning, the counters may count to their maximum more than once in each scanning cycle.

If, for example, the groups of field counting chain stages at the first three field locations in the order of scanning each consist of 25 such stages, the binary counter at the second field location is capable of counting to at least 26 and includes for this purpose at least five Eccles-Jordan circuits. At the third station, the counter is capable of counting to at least 51 and includes accordingly at least six such circuits. At the first field location no counter is necessary. The counters register the stepping pulses and when the count reaches 25, being the number of step periods allocated to the first location, the second field location is then made operative on the next count to receive and transmit. When the count registered by the counter at the third field location reaches 50, the scan is completed at the second location and then commences in the third.

An alternative use of the binary counter enables the AND circuit to be dispensed with. The output, instead of being obtained from the AND circuit, is obtained directly from the last one of the series of circuit stages of the binary counter. If the change of condition of this stage is not representative of the desired step count, a predetermined datum count is imposed on the counter, each time it is reset, by appropriate arrangement of the connections to reset line RL. This datum count is determined by the difference between the count represented by the change of condition of the last circuit stage after a full count and the desired count. Considering the numerical example quoted above, the initial change of condition, i.e., transistor TR8 becomes conducting, of the last circuit stage of a counter having five stages, as provided at the second field location, represents the number 32, whereas the desired count is 26. The datum count obtained by subtraction is 6 and this count is therefore imposed on the counter each time it is reset. If the desired count were 32, the imposition of a datum count would of course be unnecessary.

Although we have herein shown and described several forms of apparatus embodying the system of our invention, it is to be understood that other changes and modifications may be made to the system within the scope of the appended claims without departing from the spirit and scope of the invention.

Having thus described our invention, what we claim is:

1. In a remote control system including a plurality of separate locations, the combination comprising, a communication channel connecting all locations of said system, a source of stepping pulses having connections for transmitting a plurality of consecutive pulses over said channel, a consecutive series of groups of counting stages forming a single counting chain, one group at each of said separate locations and operable in cascade by said stepping pulses when properly conditioned therefor, and control means responsive to the total progression of said stepping pulses from a preselected point in each consecutive transmission and having control connections to said groups for transferring between consecutive stepping pulses the condition of operable response to said stepping pulses from one group of stages to the consecutive group when the cascaded operation of said one group is completed.

2. In a remote control system, in combination, a communication channel, a source of master stepping pulses having connections for transmitting consecutive pulses over said channel, a series of separated counting stage groups, each group having connections to said channel completed at selected times, each group of stages being operable by said stepping pulses consecutively from stage to stage when the corresponding channel connection is complete, and a transfer means having connections to each group of stages and controlled by the stepping pulses in accordance with the total number transmitted for consecutively completing the connections between said series of groups and said channel.

3. In a remote control system including at least a first, a second and a third location connected by a communication channel, the combination comprising, a master stepping source at said third location connected to said channel for consecutively transmitting stepping pulses, a first portion of a remote counting chain at said first location, a second portion of said remote counting chain at said second location, each portion being operable by said stepping pulses when made responsive thereto for stepping through a selected number of pulses to scan a fixed series of functional elements at the corresponding location, a pulse counting means at said first and said second locations connected to said channel and controlled by said stepping source for counting all the pulses from a preselected point in said consecutive transmission, and control means at said first and said second location each controlled by the corresponding counting means for rendering the corresponding portion of said remote counting chain responsive to said stepping pulses only when the corresponding counting means registers a preselected count, the first location count differing from the second location count.

4. In a remote control system including at least a first, a second, and a third location connected by a communication channel, the combination comprising, a stepping supply source at said third location connected to said channel for consecutively transmitting a plurality of stepping pulses, a first portion of a remote counting chain at said first location, a second portion of said chain at said second location, each portion operable when responsive to stepping pulses for stepping through a predetermined number of pulse periods to scan a series of functional elements at the corresponding location, said first portion being permanently connected to said channel for continuous responsiveness to said stepping pulses, a pulse counting means at said second station connected to said channel and controlled by source for counting all stepping pulses from a preselected initial point in said consecutive transmission, and control means at said second location connected to said second chain portion and controlled by said counting means for initiating the response of said second chain portion to said stepping pulses when said counting means registers a count indicative of the completion of the predetermined number of pulse periods assigned to said first chain portion after said initial point.

5. In a remote control system including an office and a plurality of remote stations connected in consecutive order by a communication channel, the combination comprising, a stepping supply source at said office having connections to said channel for transmitting consecutive stepping pulses, a portion of a remote counting chain at each of said stations, each portion being operable by said stepping pulses when made responsive thereto for stepping through a predetermined number of pulses to scan a fixed series of functional elements at the corresponding station and for holding in its operated position until reset, the remote chain portion at the first station in the consecutive order having direct connections to said channel for responding to said pulses at all times, a pulse counting means at each station except said first station having connections to said channel and controlled by said source for counting all pulses from a preselected point in the consecutive transmission, and control means associated with each counting means and controlled thereby for rendering the corresponding portion of said remote counting chain responsive to said stepping pulses only when the counting means registers a count indicative of the total pulses required to scan the elements at all preceding stations in the consecutive order, and reset means periodically responsive to the transmission of stepping pulses for resetting said counting means and the station portions of said remote chain to a condition which re-establishes said preselected point.

6. In a remote control system for controlling from and indicating at a control office the positions or states of apparatus distributed in groups at a plurality of remote stations connected to said office by a communication channel, the combination comprising, a master stepping source connected to said channel for transmitting consecutive pulses over said channel to define the step periods of an apparatus scanning action, a first counting chain at said office controlled by said stepping pulses for controlling the scanning at said office, a second counting chain distributed in groups of consecutive stages at said remote stations in accordance with the distribution of said apparatus, each group of stages being responsive at times to said stepping pulses for controlling the scanning at the corresponding station, code transmission means at each location controlled by the associated stages of the corresponding counting chain for sequentially characterizing the controls and indications transmitted during each step period, and a transition control means controlled by said master stepping source in accordance with the existing count of said pulses from a preselected initial point for transferring the stepping pulse responsive condition from one group of second chain counting stages to the consecutive group in the scanning order when said one group has completed its scanning action.

7. In a remote control system including a control office and a plurality of field stations connected by a communication channel, the combination comprising, a stepping pulse source having connections to said channel for transmitting consecutive stepping pulses, an office and a field counting chain each including a predetermined plurality of consecutive stages, the stages of said field chain being divided into station groups one group at each field station, each chain being controllable by the stepping pulse source to advance the chain count consecutively through the corresponding stages, circuit means having connections for stepping said office chain through its consecutive stages in response to the stepping pulses, and other means responsive to a continuing count of all the consecutive stepping pulses for extending the control of said field chain by said source in turn to each subsequent group of field chain stages only as the counting action in a preceding station group of stages is completed, each extension of control occurring between consecutive stepping pulses.

8. In a remote control system including an office and a plurality of stations connected by a communication channel, the combination comprising, a master stepping pulse source at said office for supplying a consecutive series of pulses, a plurality of carrier current transmitters of different frequencies at said office, one transmitter for each station, each transmitter controlled at times by said pulse source and having connections for transmitting when activated, carrier pulses of the corresponding frequency over said channel, an office and a field counting chain each including a corresponding plurality of stages arranged for consecutive operation, said office chain having connections to said pulse source and responsive thereto for stepping through each counting cycle, said field chain being divided into a group of stages at each station, each group having connections to said channel responsive only to a selected pulse carrier frequency different from that selected at any other station for stepping through the consecutive stages when pulses of the selected frequency are received, and detection means at said office responsive to the operation of said office counting chain for activating the carrier frequency transmitter for a particular station only when the office chain stages corresponding to the group of field chain stages at the particular station are stepped by said pulse source.

9. In a remote control system including an office and a first and a second station connected by a communication channel, the combination comprising, a master stepping pulse source at said office for supplying a consecutive series of pulses, a first and a second carrier current transmitter of different frequencies at said office corresponding to said first and said second station respectively, each transmitter controlled at times by said pulse source and having connections for transmitting when activated carrier pulses of the corresponding frequency over said channel, an office and a field counting chain each including a corresponding plurality of stages arranged for consecutive operation, said office chain having connections to said pulse source for stepping through each counting cycle, said field chain being divided into a group of stages at each station, each station group having connections to said channel responsive to the pulse carrier frequency transmitted by the corresponding carrier frequency transmitter for stepping through the consecutive stages of that group when pulses of the corresponding frequency are transmitted, a first detection means at said office responsive to the stepping operation of the office chain stages corresponding to the field chain stages in the first station group for activating said first carrier frequency transmitter only during that period, and a second detection means responsive to the operation of the office chain stages corresponding to the field chain stages in the second station group for activating said second carrier transmitter only during that period.

10. In a remote control system including a plurality of separate stations connected by a communication channel, the combination comprising, a source of stepping pulses having connections for transmitting a plurality of consecutive pulses over said channel, a plurality of consecutive groups of counting stages forming a single consecutive counting chain, one group at each of said separate stations, each group operable in cascade by said stepping pulses when conditioned to be responsive thereto, and control means responsive at selected times to the total number of stepping pulses transmitted from a preselected point in each consecutive series for conditioning the groups of counting stages in consecutive order to be responsive to said stepping pulses.

11. In a remote control system including an office and a plurality of remote stations connected in consecutive order by a communication channel, the combination comprising, a master stepping source at said office having connections to said channel for transmitting periodic series of consecutive stepping pulses, a portion of a remote counting chain at each of said stations, each chain portion being operable by said stepping pulses when made responsive thereto for stepping through a predetermined number of pulses to scan a corresponding number of functions at that station, each said chain portion holding in its operated condition until reset, a binary counting means at each station having connections to said channel and controlled by said source for counting pulses from a preselected initial point in each consecutive series at least through the total number of pulses assigned to the preceding portions of said remote counting chain, control means associated with each binary counting means and controlled thereby for rendering the corresponding portion of said remote counting chain responsive to said stepping pulses only when the associated binary counting means registers a count equal to the pulses assigned to the preceding portions of said chain, and reset means responsive to the completion of each periodic series of stepping pulses for resetting each said binary counting means and each portion of said remote chain to reestablish said initial point.

12. In a remote control system including an office and a plurality of remote stations connected in consecutive order by a communication channel, the combination comprising, a master stepping source at said office having connections to said channel for transmitting periodic series of consecutive stepping pulses, a portion of a remote counting chain at each of said stations, each chain portion being operable by said stepping pulses when made responsive thereto for stepping through a predetermined number of pulses to scan a corresponding number of functions at that station, each said chain portion holding in its operated condition until reset, a binary counting means at each station having connections to said channel and controlled by said source for counting pulses from a preselected initial point in each consecutive series, each binary counting means being capable of registering a number of pulses in excess of a preselected number at which the corresponding portion of said remote chain is made responsive to said stepping pulses, control means associated with each binary counting means and controlled thereby for rendering the corresponding portion of said remote counting chain responsive to said stepping pulses only when the associated binary counting means registers a count equal to the pulses assigned to the preceding portions of said chain, and a reset means at each station responsive to the completion of each periodic series of stepping pulses for resetting the associated portion of said remote chain to its non-operated condition and for registering in the associated binary counting means a datum count equal to the difference between the excess count of that binary counting means and the preselected number for the associated portion of said remote chain.

References Cited in the file of this patent

UNITED STATES PATENTS

| | | |
|---|---|---|
| 2,524,123 | Dickinson | Oct. 3, 1950 |
| 2,542,644 | Edson | Feb. 20, 1951 |
| 2,581,056 | Walmsley et al. | Jan. 1, 1952 |
| 2,584,739 | Rees et al. | Feb. 5, 1952 |
| 2,614,217 | Hansen | Oct. 14, 1952 |
| 2,619,282 | Manley | Nov. 25, 1952 |
| 2,629,088 | Kendall | Feb. 17, 1953 |
| 2,649,580 | Dunn | Aug. 18, 1953 |
| 2,669,390 | Manley | Feb. 16, 1954 |
| 2,724,049 | Rouault | Nov. 15, 1955 |
| 2,794,179 | Sibley | May 28, 1957 |
| 2,934,678 | Sibley | Apr. 26, 1960 |
| 3,035,248 | Grose et al. | May 15, 1962 |